US007571045B2

(12) United States Patent
Muramatsu et al.

(10) Patent No.: US 7,571,045 B2
(45) Date of Patent: Aug. 4, 2009

(54) CONTROL SYSTEM FOR GAS-TURBINE ENGINE

(75) Inventors: Hironori Muramatsu, Wako (JP); Yukinobu Sugitani, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 769 days.

(21) Appl. No.: 11/135,399

(22) Filed: May 24, 2005

(65) Prior Publication Data
US 2005/0267667 A1    Dec. 1, 2005

(30) Foreign Application Priority Data
May 26, 2004    (JP)    ............................. 2004-156636

(51) Int. Cl.
*G06F 19/00*    (2006.01)
(52) U.S. Cl. ................................ 701/100; 701/3; 701/4; 322/14; 322/15; 322/24; 322/28; 322/99; 290/40 R; 290/40 C; 244/181; 244/182; 60/790; 60/39.281; 702/130
(58) Field of Classification Search ............... 701/11, 701/14, 34, 35, 66, 100, 104; 60/39.281, 60/204, 238, 239, 243, 773; 702/35, 116, 702/193; 477/30; 700/6, 44, 67, 80, 83, 700/100, 282, 286, 287; 322/14, 15, 24, 322/28, 99
See application file for complete search history.

(56) References Cited

U.S. PATENT DOCUMENTS

| | | | | |
|---|---|---|---|---|
| 3,866,109 A | * | 2/1975 | Reed et al. | 322/15 |
| 3,898,439 A | * | 8/1975 | Reed et al. | 700/287 |
| 3,924,140 A | * | 12/1975 | Yannone | 290/40 R |
| 4,031,407 A | * | 6/1977 | Reed | 307/87 |
| 4,039,804 A | * | 8/1977 | Reed et al. | 700/287 |
| 4,259,835 A | * | 4/1981 | Reed et al. | 60/39.281 |

(Continued)

FOREIGN PATENT DOCUMENTS
GB    2 355 081 A    4/2001

(Continued)

OTHER PUBLICATIONS

Shutler, Control configuration design for the aircraft gas turbine engine, 1995, Internet. p. 22-28.*

(Continued)

*Primary Examiner*—Khoi Tran
*Assistant Examiner*—McDieunel Marc
(74) *Attorney, Agent, or Firm*—Squire, Sanders & Dempsey L.L.P.

(57) ABSTRACT

In a gas-turbine engine control system having a first control channel inputting the outputs of sensors to calculate and output a first command value indicative of a quantity of fuel to be supplied to the engine and a second control channel inputting the outputs of the sensors to calculate and output a second command value similarly indicative of the quantity of fuel, the second control channel calculates and outputs the second command value using the first command value so long as the instruction to switch the outputs is not generated, while calculates and outputs the second command value, without using the first command value, when the instruction to switch the outputs is generated. With this, immediately after switching to the second command value, the second command value is made substantially equal to and not greatly different from the preceding first command value.

18 Claims, 8 Drawing Sheets

U.S. PATENT DOCUMENTS

| | | | |
|---|---|---|---|
| 4,494,208 A | | 1/1985 | Chang |
| 5,067,080 A | | 11/1991 | Farman |
| 5,436,826 A | | 7/1995 | O'Flarity |
| 5,913,917 A | * | 6/1999 | Murphy ...................... 701/123 |
| 6,063,515 A | * | 5/2000 | Epp et al. ...................... 429/17 |
| 6,353,790 B1 | * | 3/2002 | Tsuzuki ...................... 701/100 |
| 6,393,355 B1 | * | 5/2002 | Muramatsu ................. 701/100 |
| 6,434,473 B1 | * | 8/2002 | Hattori ....................... 701/100 |
| 7,237,382 B2 | * | 7/2007 | Muramatsu et al. ........... 60/773 |
| 7,246,024 B2 | * | 7/2007 | Muramatsu et al. ......... 702/116 |
| 7,246,495 B2 | * | 7/2007 | Muramatsu et al. ........... 60/773 |
| 2005/0217273 A1 | * | 10/2005 | Muramatsu et al. ........... 60/773 |
| 2005/0217274 A1 | * | 10/2005 | Muramatsu et al. ........... 60/773 |
| 2005/0222822 A1 | * | 10/2005 | Muramatsu et al. ......... 702/193 |
| 2007/0055435 A1 | * | 3/2007 | Muramatsu et al. ......... 701/100 |

OTHER PUBLICATIONS

NASA Technical Memorandum, Jaw et al., Propulsion Control Technology Development in the U.S.—A Historical Perspective, 1940~2002, Internet, p. 1-3.*

Brunell et al., Nonlinear Model Predictive Control of an Aircraft Gas Turbine Engine, 2002, IEEE, p. 4649-4651.*

Gorinevsky et al., Model-Based Diagnostics for an Aircraft Auxiliary Power Unit, 2002, Internet, IEEE, p. 1-6.*

Spang et al., Jet Engine Control, Implementations, 1999, Internet, p. 14-26.*

Chpter 14, Transition to Turbopropeller Power Airplanes, May 7, 2004, Internet, p. 14-1 to 14-12.*

Hingston et al., Development of a digital excitation control system, 1989, IEEE, p. 125-129.*

* cited by examiner

| CONDITION | PRIMARY LANE INSPECTION FLAG | SECONDARY LANE INSPECTION FLAG | PRIMARY LANE FAULTY FLAG | SECONDARY LANE FAULTY FLAG | PRIMARY LANE CALCULATION | SECONDARY LANE CALCULATION |
|---|---|---|---|---|---|---|
| (1) | 0 | 1 | 0 | 0 | OUTPUTTED VALUE = DIFFERENCE + PRECEDING VALUE @P | CURRENT VALUE @S = (CURRENT VALUE @S − PRECEDING VALUE @P) + PRECEDING VALUE @P |
| (2) | 1 | 0 | 0 | 0 | CURRENT VALUE @P = (CURRENT VALUE @P − PRECEDING VALUE @P) + PRECEDING VALUE @P | OUTPUTTED VALUE = DIFFERENCE + PRECEDING VALUE @S |
| (3) | 0 | 1 | 0 | 0 | OUTPUTTED VALUE = DIFFERENCE + PRECEDING VALUE @P | CURRENT VALUE @S = (CURRENT VALUE @S − PRECEDING VALUE @S) + PRECEDING VALUE @S |
| (4) | 0 | 1 | 1 | 0 | INOPERATIVE | CURRENT VALUE @S = (CURRENT VALUE @S − PRECEDING VALUE @S) + PRECEDING VALUE @S |
| (5) | 0 | 1 | 1 | 1 | | INOPERATIVE |

CONTROL SYSTEM FOR GAS-TURBINE ENGINE

BACKGROUND OF THE INVENTION

1. Field of the Invention

This invention relates to a control system for a gas-turbine engine, more specifically a control system for a gas-turbine engine used in aircraft.

2. Description of the Related Art

A control system for a gas-turbine engine, particularly a gas-turbine engine used in aircraft, is generally equipped with at least two control channels, commonly referred to as the primary lane and secondary lane. The two control channels input the signals generated by a number of sensors provided in the respective channels for outputting values indicative of the turbine speed and other engine operating conditions. Based on the inputted values, they calculate a command value designating the amount of fuel to be supplied to the engine and perform self-diagnosis for determining presence/absence of malfunctions. When the primary lane does not make a fail self-diagnosis, the output of the command value calculated by the primary lane is outputted, while when the primary lane makes a fail self-diagnosis, the command value calculated by the secondary lane is outputted insofar as the secondary lane does not make a fail self-diagnosis. Fuel is supplied to the engine based on the outputted command value.

The command value in the two control channels is usually calculated from the sensor outputs using proportional and integral terms. Therefore, when the command value is immediately switched from that calculated by the primary lane to that calculated by the secondary lane, the newly implemented command value is liable to be inappropriate because the difference between the switched command value and the preceding command value becomes large due to the integral term.

To cope with this problem, U.S. Pat. No. 5,436,826 teaches a control system that includes dual fuel control having individual sensors that monitors N2 (high speed fan speed). Each control uses the average value of N2 from both sensors for providing fuel to the engine and performing other operations. The fuel controls contain signal processors capable of determining if their respective sensors are operating out of range, in which case the fuel control uses the value of N2 from sensors associated with the other fuel control. If both sensors are out of range, the signal processors use a stored value for N2 or a value synthesized from another engine parameter.

This prior art control system calculates the final command value from the outputs of the two controllers and does not rewrite the output of the primary lane with that of the secondary lane when the primary lane makes a fail self-diagnosis. The system therefore cannot overcome the problem that when the command value calculated by the primary lane is rewritten by that calculated by the secondary lane, the command value becomes inappropriate because the difference between it and the preceding command value becomes large.

SUMMARY OF THE INVENTION

The object of this invention is therefore to overcome the foregoing problem by providing a control system for a gas-turbine engine that can switch from the command value calculated by one of two control channels to the command value calculated by the other control channel when one of the two control channels makes a fail self-diagnosis, without causing a large difference to occur between the command values before and after switching.

In order to achieve the object, the present invention provides a system for controlling a gas-turbine engine having at least a turbine, comprising: a plurality of sensors generating outputs indicative of operating conditions of the engine including—a rotational speed of the turbine; a first control channel inputting the outputs of the sensors to calculate a first command value indicative of a quantity of fuel to be supplied to the engine and outputting the first command value; a second control channel being operative in parallel with the first control channel, inputting the outputs of the sensors to calculate a second command value indicative of the quantity of fuel to be supplied to the engine and outputting the second command value; a switching instruction generator generating an instruction to switch from one to the other between the outputs of the first and second control channels in response to the operating condition of the engine; and a fuel control unit controlling the supply of fuel to the engine based on the switched one of the outputs of the first and second control channels; wherein the second control channel calculates and outputs the second command value using the first command value so long as the instruction to switch the outputs is not generated, while calculates and outputs the second command value, without using the first command value, when the instruction to switch the outputs is generated.

DETAILED DESCRIPTION OF THE PREFERRED EMBODIMENT

Control system for a gas-turbine engine according to a preferred embodiment of this invention will now be explained with reference to the drawings.

Figure 1:
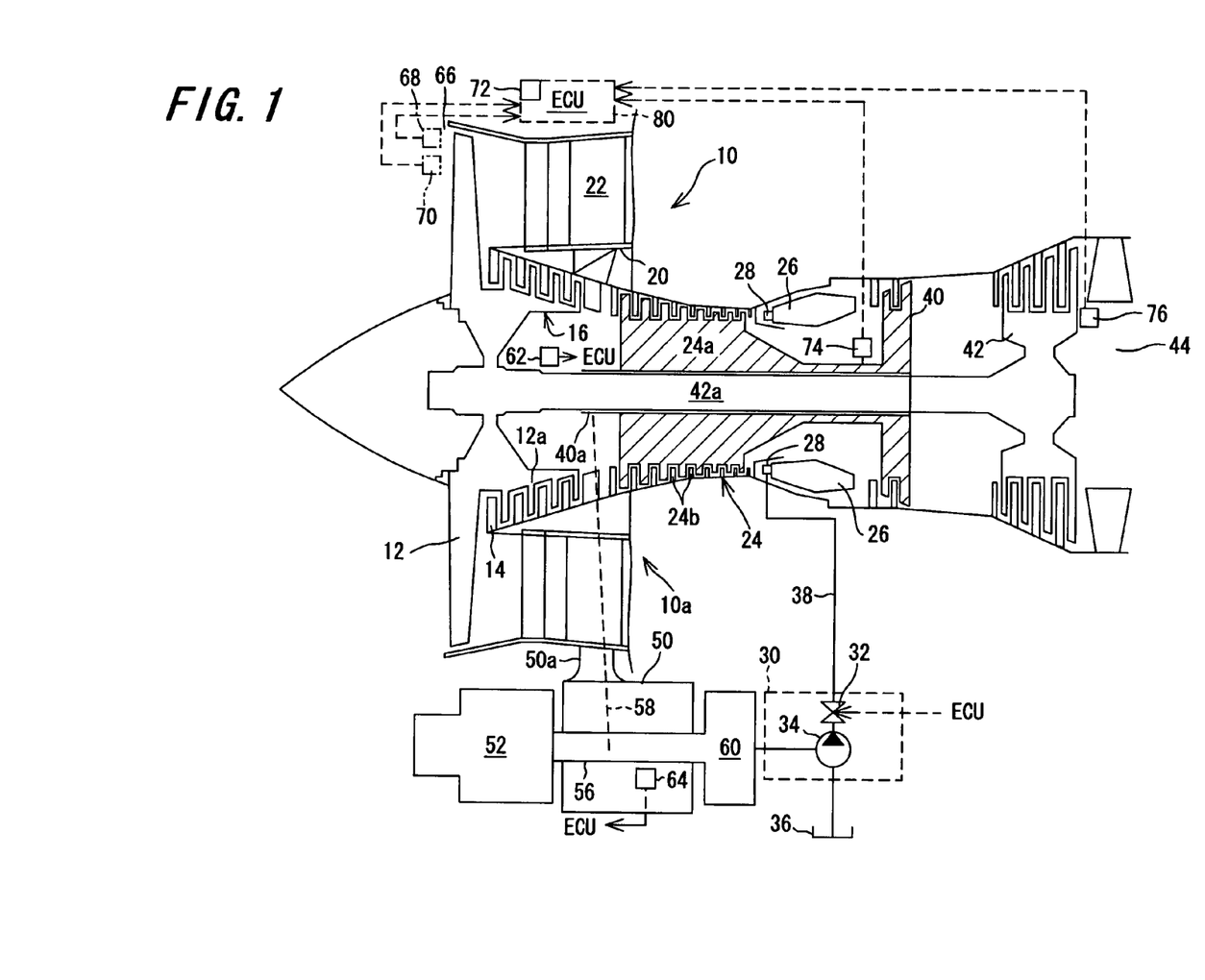
FIG. 1 is an overall schematic view of a control system for a gas-turbine engine according to an embodiment of this invention.

FIG. 1 is an overall schematic view of a control system for a gas-turbine engine according to an embodiment of this invention.

The explanation will be made taking a gas-turbine engine for aircraft as an example of the gas-turbine engine. Four types of gas-turbine engines are commonly used in aircraft: the turbojet engine, turbofan engine, turboprop engine and turboshaft engine. A two-spool (shaft) turbofan engine will be taken as an example in the following explanation.

In FIG. 1, reference numeral 10 designates a turbofan engine (gas-turbine engine; hereinafter referred to as "engine"). Reference numeral 10a designates its main engine unit. The engine 10 is mounted at an appropriate location of an airframe (not shown). The engine 10 is equipped with a fan 12 (rotor blades) that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator or splitter 20. Most of the air pulled in passes through the duct 22 to be jetted rearward of the engine without being burned at a later stage (in the core). The force of the air accelerated rearward by the fan produces a force of reaction that acts on the aircraft (not shown) as a propulsive force (thrust). Most of the propulsion is produced by the air flow from the fan.

The air compressed by the low-pressure compressor 16 flows rearward to a high-pressure compressor 24 where it is further compressed by a rotor 24a and a stator 24b and then flows rearward to a combustion chamber 26.

The combustion chamber 26 is equipped with fuel nozzles 28 that are supplied with pressurized fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion is sent to a high-pressure turbine 40 and rotates the high-pressure turbine 40 at high speed. The high-pressure turbine 40, more specifically its rotor, is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which rotates at relatively low speed. The low-pressure turbine 42, more precisely its rotor, is connected to the rotor 12a of the low-pressure compressor 16 through a low-pressure turbine shaft 42a. The rotor 12a and the fan 12 are therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and a gear mechanism including a bevel gear etc.; not shown) so as to pull in air needed for combustion.

The rotation of the shaft 56 is also transmitted to a PMA (Permanent Magnet Alternator) 60 and the high-pressure fuel pump 34. The fuel pump 34 is therefore driven to spray fuel from the fuel nozzles 28 as explained above. The resulting air-fuel mixture is ignited to start combustion.

When the engine 10 reaches self-sustaining operating speed, the rotation of the high-pressure turbine shaft 40a is transmitted back through the drive shaft 58 (and the gear mechanism including the bevel gear etc.) to the shaft 56 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 generates an output or signal proportional to the speed of the low-pressure turbine (speed of the low-pressure turbine shaft 42a) N1. An N2 sensor (speed sensor) 64 installed near the shaft 56 generates an output or signal proportional to the speed of the high-pressure turbine (speed of the high-pressure turbine shaft 40a) N2.

A T1 sensor (temperature sensor) 68 and a P1 sensor (pressure sensor) 70 installed near an air intake 66 at the front of the main engine unit 10a generate outputs or signals proportional to the temperature T1 and the pressure P1 of the inflowing air at that location. A P0 sensor (pressure sensor) 72 installed inside an ECU (Electronic Control Unit) explained below generates an output or signal proportional to atmospheric pressure P0 acting on the engine 10. A temperature sensor (not shown) provided inside the ECU generates an output or signal proportional to the temperature of the ECU.

A P3 sensor (pressure sensor) 74 installed downstream of the rotor 24a generates an output or signal proportional to the output pressure P3 of the high-pressure compressor 24. An EGT sensor (temperature sensor) 76 installed at an appropriate location downstream of the low-pressure turbine 42 generates an output or signal proportional to the exhaust gas temperature EGT (temperature of the exhaust gas exiting the low-pressure turbine 42).

The aforementioned ECU (designated by reference numeral 80) is incorporated at an upper end position of the main engine unit 10a. The outputs of the sensors mentioned above are sent to the ECU 80.

Figure 2:
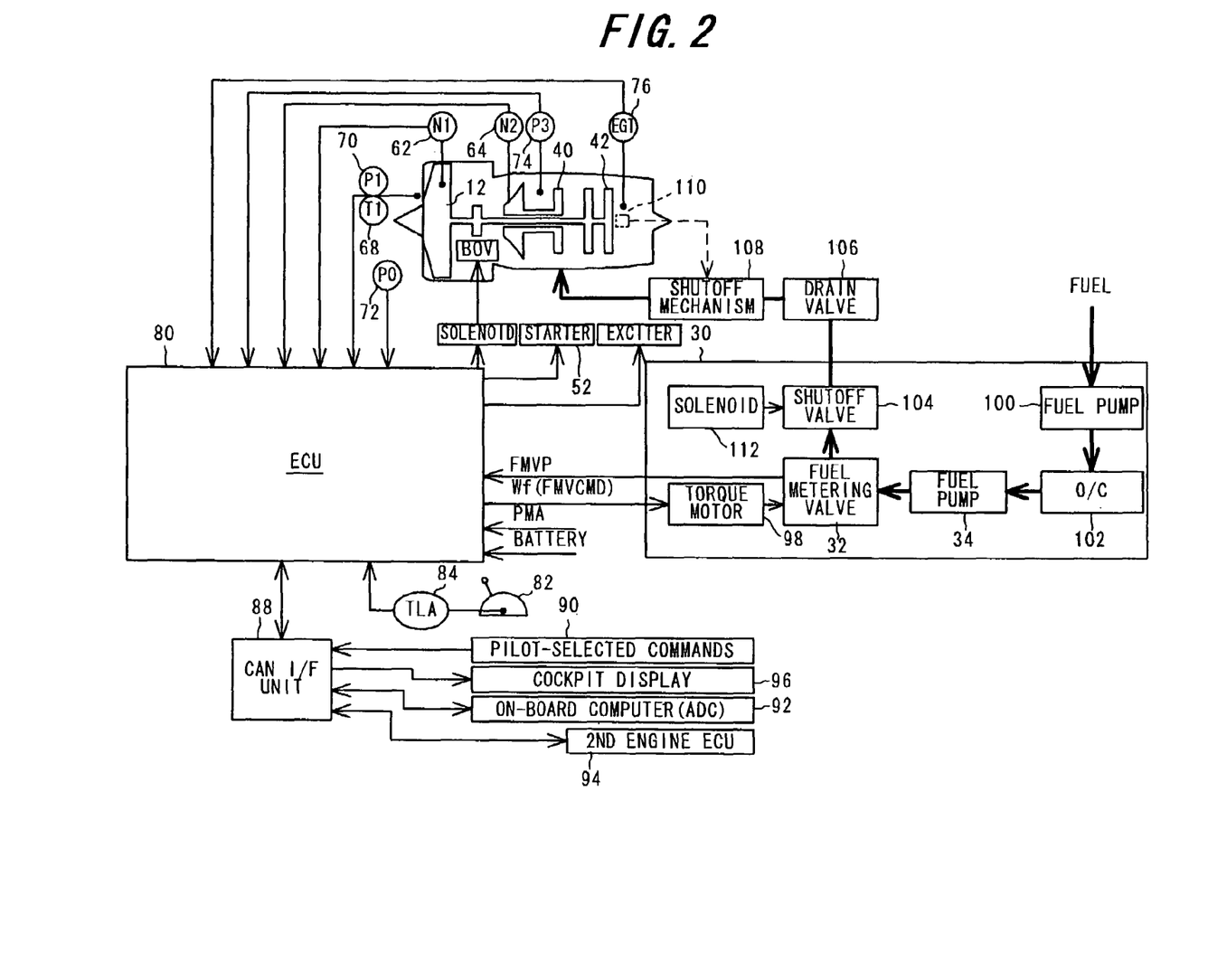
FIG. 2 is a block diagram showing the overall configuration of an ECU and an FCU, illustrated in FIG. 1, in detail.

The ECU 80 and the FCU 30 are illustrated in the block diagram of FIG. 2, with the overall configuration of the FCU 30 being shown in detail.

In addition to the group of sensors set out above, a TLA (thrust lever angle) sensor 84 installed near a thrust lever (throttle lever) 82 provided near the pilot's seat (cockpit; not shown) generates an output or signal proportional to the thrust lever angle or position TLA set or inputted by the pilot (corresponding to the pilot desired thrust). The output of the TLA sensor 84 is also forwarded to the ECU 80. In FIG. 2, and also in FIGS. 3 and 4 discussed later, the sensors (P0 sensor, TLA sensor etc.) are indicated by the symbols for the parameters they detect (P0, TLA etc.).

An FMVP sensor (valve position sensor; not shown in FIG. 2) installed at an appropriate location in the FCU 30 generates an output or signal proportional to the valve position FMVP of the fuel metering valve 32. The output of the FMVP sensor is also forwarded to the ECU 80.

The ECU 80 is also connected with a CAN (Control Area Network) communications interface unit (shown as "CAN interface unit") 88 through which it receives (or sends) pilot-selected commands 90 from devices other than the thrust lever 82, data from an on-board computer (Air Data Computer or ADC) 92 (e.g., Mach number Mn, (pressure) altitude ALT and outside air temperature (total air temperature TAT and (absolute) surface air temperature SAT)) and data from an ECU 94 of a second engine (not shown). The data in the ECU 80 are sent through the communications interface unit 88 to be displayed on a display 96 located in the cockpit.

Figure 3:
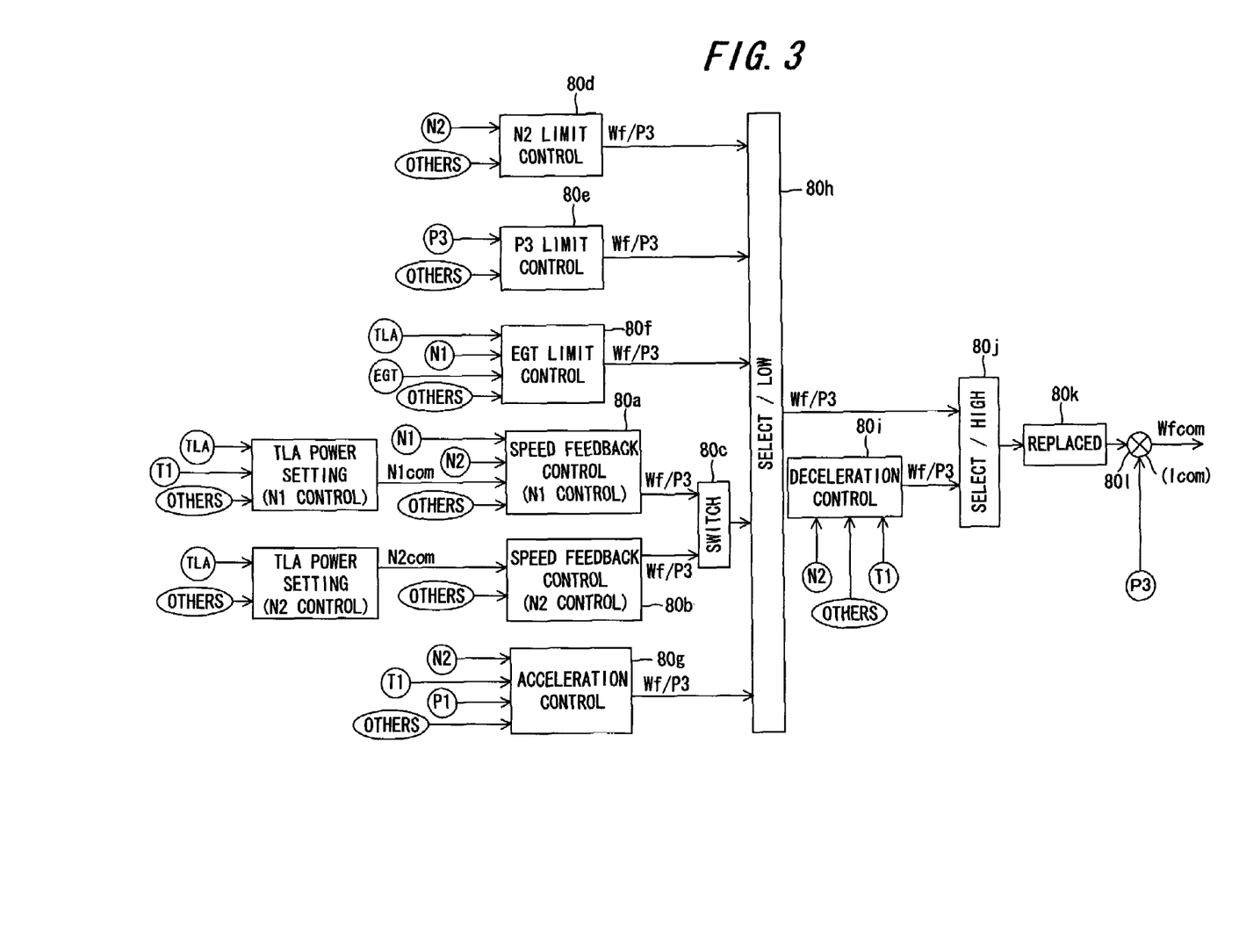
FIG. 3 is a block diagram showing the operations of the ECU, illustrated in FIG. 2, in a functional manner.

FIG. 3 is a block diagram showing the operations of the ECU 80 (illustrated in FIG. 2) in a functional manner.

The ECU 80 is activated once every 40 msec to perform the illustrated processing operations based on the inputted values. Specifically, in block 80a, the ECU 80 calculates a command value (control input or manipulated variable) Wf for controlling the quantity (flow rate) of fuel to be supplied to the engine 10 in response to the thrust lever angle TLA or the like, such that the difference between the low-pressure turbine speed N1 and a desired speed N1com is reduced. Block 80a outputs the value obtained by dividing the calculated command value Wf by the output pressure P3 of the high-pressure compressor 24.

In a parallel operation conducted in block 80b, the ECU 80 similarly calculates a command value Wf in response to the thrust lever angle TLA or the like, such that the difference between the high-pressure turbine speed N2 and a desired speed N2com is reduced, divides the result by the output pressure P3, and outputs the quotient. The values calculated in blocks 80a and 80b are sent to block 80c, where one of them is selected.

In blocks 80d, 80e and 80f, the ECU 80 calculates command values Wf based on the detected high-pressure turbine speed N2, output pressure P3, exhaust gas temperature EGT etc., such that each is within a range not exceeding a corresponding limit value, divides each result by the output pressure P3, and outputs the quotient. In block 80g, the ECU 80 uses the high-pressure turbine speed N2 etc. to calculate a value of the same kind for acceleration when the engine 10 is under acceleration.

The outputs of block (switch) 80c, block 80d and other blocks are forwarded to block 80h, which selects the lowest (minimum) value among the calculated values. In block 80i, the ECU 80 uses the high-pressure turbine speed N2 etc. to calculate a value of the same kind for deceleration when the engine 10 is under deceleration. The value calculations in blocks 80a, 80b, 80d, 80e and 80f are done using proportional and integral terms and the value calculation in block 80g is done using proportional and differential terms.

The outputs of blocks 80h and 80i are forwarded to block 80j, where the highest (maximum) value is selected. The selected value is forwarded through block 80k to a multiplication stage 801 to be multiplied by the output pressure P3 and the so-obtained product, i.e., the numerator (Wf), is calculated as the command value (control input or manipulated variable) Wfcom (FMVCMD) for regulating the final quantity (flow rate) of fuel to be supplied to the engine 10. The current command value Icom for the torque motor 98 is calculated based on the command value Wfcom and sent to the FCU 30. The command value is rewritten in block 80k preceding the multiplication stage 801. This will be explained later.

The explanation of FIG. 2 will be resumed.

The FCU 30 is equipped with a low-pressure (fuel) pump 100 that pumps fuel from the fuel tank 36 (not shown in FIG. 2) and supplies it to the high-pressure (fuel) pump 34 through a filter (and oil cooler) 102. The high-pressure pump 34 raises the fuel to a high pressure and supplies it to the fuel metering valve 32. The fuel metering valve 32 is connected with the torque motor 98, which controls its spool position. The flow rate of the fuel pressurized by the fuel pump 34 is therefore regulated (metered) by the fuel metering valve 32 in response to the spool position thereof. The metered fuel is supplied to the fuel nozzles 28 through a shutoff valve 104, a drain valve 106 and a shutoff mechanism 108.

Thus, the ECU 80 calculates the command value Wfcom (FMVCMD) indicating the flow rate of fuel to be supplied to the engine 10 at 40 msec intervals. The ECU 80 calculates and outputs the current command value Icom from the command value Wfcom (FMVCMD). The FCU 30 inputs the calculated current command value Icom for the torque motor 98 and based thereon, regulates the supply of fuel so as to achieve the fuel flow rate calculated. Note that, in FIG. 2, the command value Wfcom (FMVCMD) is illustrated as Wf (FMVCMD) and the illustration of Icom is omitted.

An emergency stop switch 110 is connected to the low-pressure turbine shaft 42a. If the low-pressure turbine shaft 42a should be displaced for some reason, the emergency stop switch 110 will turn on to operate the shutoff mechanism 108 and mechanically block supply of fuel to the fuel nozzles 28. In addition, a solenoid 112 is provided in association with the shutoff valve 104. The solenoid 112 is responsive to a pilot-selected command 90 for operating the shutoff valve 104 to block supply of fuel to the fuel nozzles 28.

Figure 4:
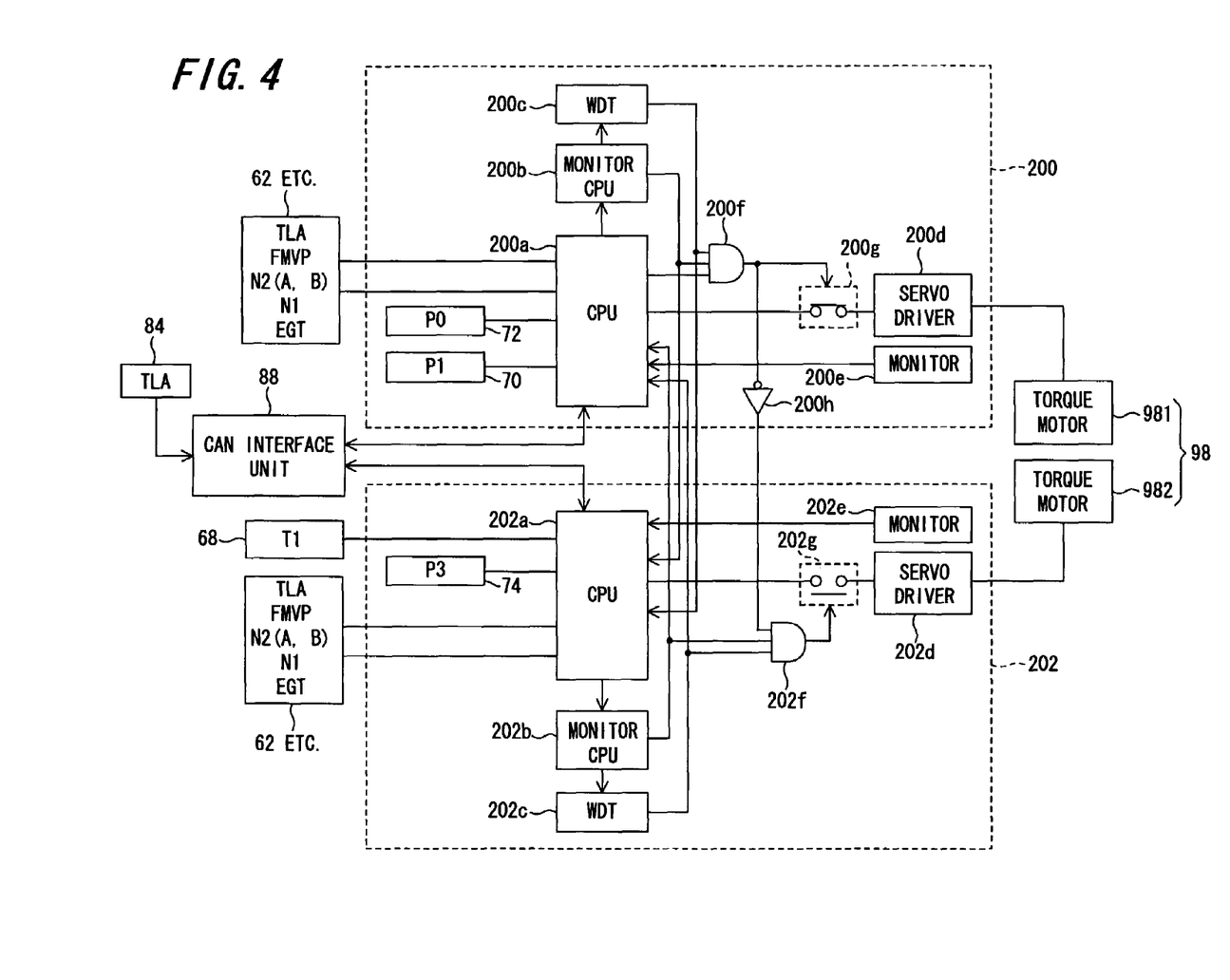
FIG. 4 is a block diagram showing the configuration of the ECU and FCU in a hardware manner.

FIG. 4 is a block diagram showing the configuration of the ECU 80 and FCU 30 in a hardware manner.

Because the engine 10 is a gas-turbine aeroengine, the ECU 80 and FCU 30 are composed of a primary lane (first control channel) 200 and a secondary lane (second control channel) 202, respectively equipped with a CPU 200a and a CPU 202a for conducting the aforesaid operations, a monitor CPU 200b and a monitor CPU 202b for monitoring the operation of the CPU 200a and CPU 202a, and a WDT (watchdog timer) 200c and a WDT 202c for monitoring the operation of the monitor CPUs. When a monitor discovers that an abnormal condition has arisen in the lane 200, the lane 202 conducts fuel supply control in place of the lane 200.

The CPUs 200a and 202a operate as the ECU 80 and FCU 30. That is, they use the sensor outputs indicated in the drawing to calculate the current command value for supply to the torque motor 98 and output the calculated value through servo drivers 200d, 202d (not shown in FIGS. 2 and 3) to the torque motor 98. (The operation of the servo drivers 200d, 202d is monitored by monitors (monitor circuits) 200e, 202e.)

As is clear from FIG. 4, the torque motor 98 actually comprises two torque motors, one designated 981 (for the primary lane) and the other designated 982 (for the secondary lane). So long as the CPU 200a of the primary lane operates normally, only the primary lane output is sent to the torque motor 98, more specifically the torque motor 981.

Moreover, two or more of many of the aforesaid various sensors are also provided. As shown, three TLA sensors 84 are provided, and their outputs are inputted to the two lanes 200, 202. Two each of the N1 sensor 62, the EGT sensor 76, and the FMVP sensor (not shown in FIG. 2) are provided, and their outputs are inputted to the two lanes 200, 202. Further, four N2 sensors 64 are provided, two for each lane (designated "A" and "B"). The outputs of the sensors A and B of each pair are inputted to the associated lane 200, 202.

The N2 sensors 64 comprise magnetic pickups. Four of the same structure are installed near the shaft 56. The N1 sensors 62 also comprise magnetic pickups of the same structure. Two are installed near the low-pressure turbine shaft 42a. Also in case of each of the other sensors, a plurality of sensors of the same structure are installed. Sensors of the same type are configured to produce identical outputs.

The outputs of the P1 sensors 70 and P0 sensors 72 are all inputted to the lane 200, and the outputs of the P3 sensors 74 are inputted to only the lane 202. The reason for inputting the outputs of these sensors only to one or the other of the two lanes is that they are less significant than the outputs of the N1 sensors 62, N2 sensors 64 and other sensors that detect turbine speed. Sensor outputs that are inputted to only one lane are sent to the other lane via the CAN interface unit 88.

The monitor CPU 200b and WDT 200c in the primary lane 200 constitute self-diagnostic circuits that use the same sensor outputs as the CPU 200a to produce the same outputs as the CPU 200a. The outputs of all three units are sent to an AND circuit 200f. If all corresponding inputs match, i.e., if all corresponding inputs are identical or substantially identical with each others, in other words, if it is found that primary lane 200 is not operating abnormally, the AND circuit 200f outputs an H-level signal to close a switch 200g, so that the output of the CPU 200a is sent to the servo driver 200d.

The monitor CPU 202b and WDT 202c in the secondary lane 202 constitute self-diagnostic circuits that produce the same outputs from the same sensor outputs and send them to an AND circuit 202f. Further, the output of the AND circuit 200f of the primary lane 200 is inputted to the AND circuit 202f of the secondary lane 202 through an inverter 200h.

Therefore, when outputs of the AND circuit 200f in the primary lane 200 match, the inputs to the AND circuit 202f of the secondary lane 202 do not match. The AND circuit 202f therefore outputs an L-level signal that opens a switch 202g to prevent forwarding of the output of the CPU 202a to the servo driver 202d. On the other hand, when the AND circuit 200f in the primary lane 200 produces a non-matching output, then, insofar as the outputs of the monitor CPU 202b and WDT 202c in the secondary lane 202 match, the AND circuit 202f of the secondary lane 202 outputs an H-level signal that closes a switch 202g to enable forwarding of the output of the CPU 202a to the servo driver 202d.

The outputs of the monitor CPU 200b and WDT 200c of the primary lane 200 are sent to the CPU 202a of the secondary lane 202 and the equivalent outputs of the secondary lane 202 are sent to the CPU 200a of the primary lane 200.

The so-configured self-diagnostic circuits determine whether or not the primary lane 200 is faulty. When it is determined to be faulty, fuel supply is controlled based on the output of the secondary lane 202 (fuel flow rate command value Wfcom (more exactly, the current command value Icom for the torque motor 98)).

The operations of the ECU 80 for rewriting the command value in block 80k of FIG. 3 will now be explained.

Figure 5:
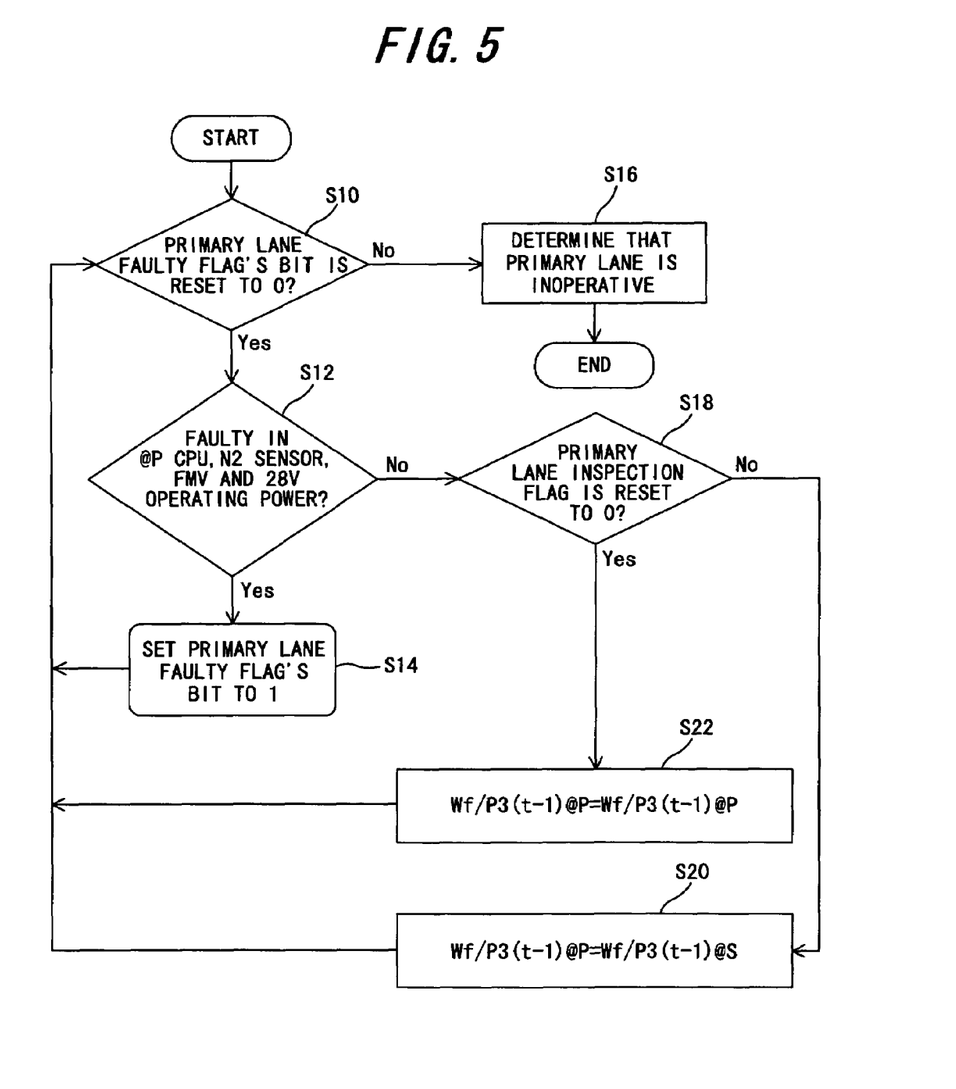
FIG. 5 is a flow chart showing the sequence of the rewriting operations of a rewriting block illustrated in FIG. 3 and the sequence of operations performed by a primary lane illustrated in FIG. 4.
Figure 6:
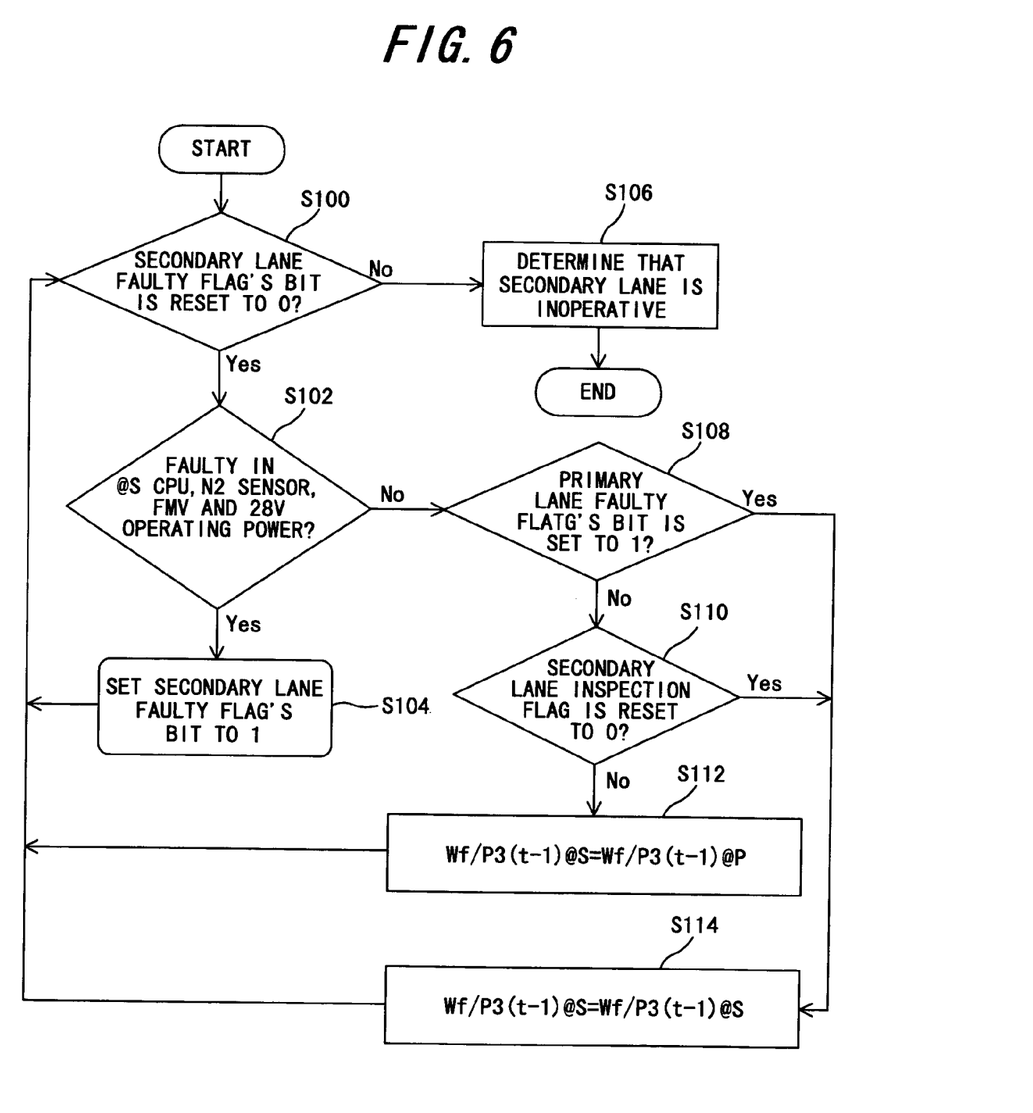
FIG. 6 is a flow chart showing the sequence of the rewriting operations of a rewriting block illustrated in FIG. 3 and the sequence of operations performed by a secondary lane illustrated in FIG. 4.

FIG. 5 is a flow chart showing the sequence of the rewriting operations, i.e., the sequence of operations performed by the primary lane 200. FIG. 6 is a similar flow chart showing the rewriting operations performed by the secondary lane 202.

Figure 7:
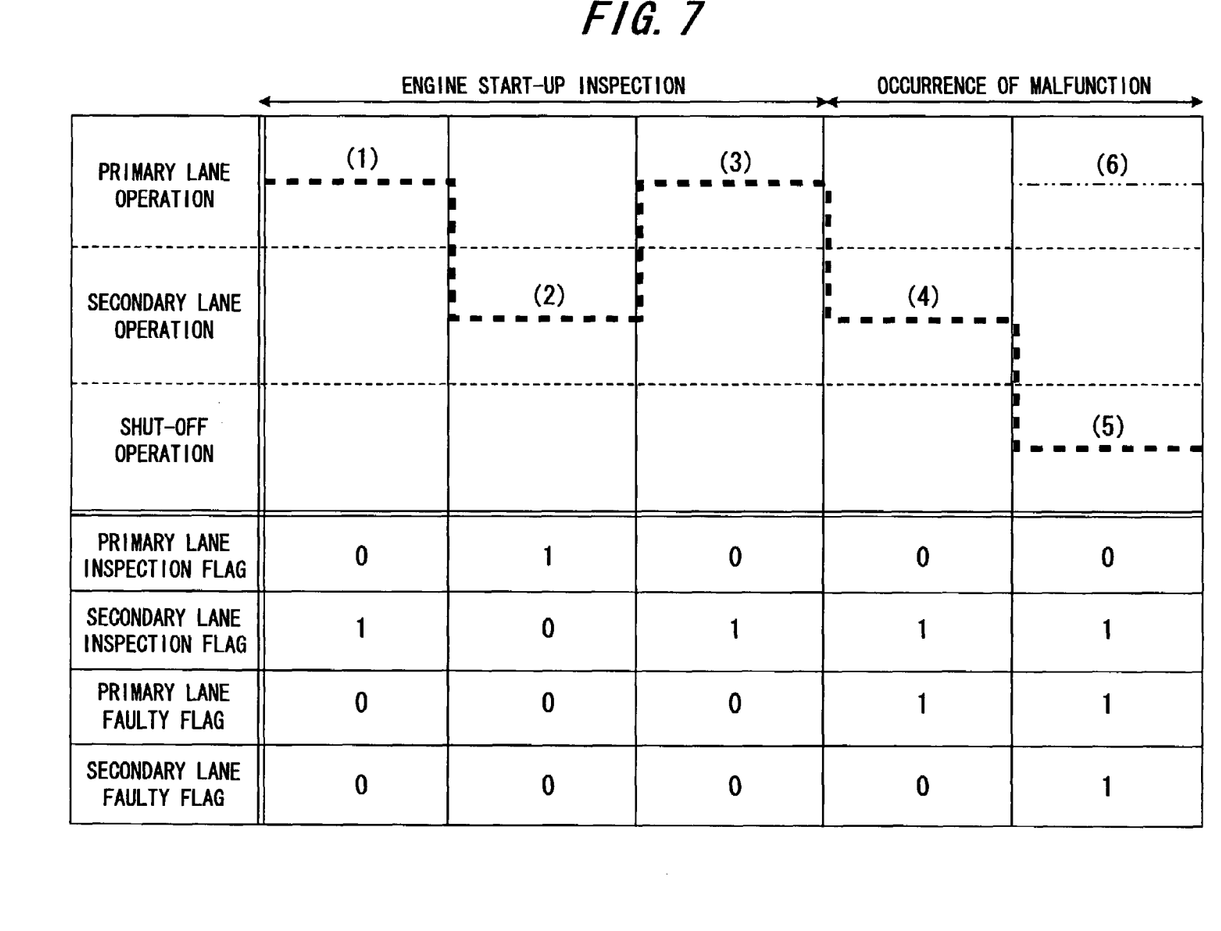
FIG. 7 is a time chart showing the time course of the operations of FIGS. 5 and 6.

As mentioned above, the calculation of the command value by the ECU 80 is done cyclically once every 40 msec. The programs of FIGS. 5 and 6 are therefore executed at the same time interval. FIG. 7 is a time chart showing the time course of the operations of FIGS. 5 and 6.

In S10 of FIG. 5, it is determined whether the bit of a primary lane faulty flag (explained later) is reset to zero. In the first loop of the program, the result in S10 is ordinarily YES and the program proceeds to S12, in which it is determined if the self-diagnostic circuit finds the CPU 200a of the primary lane 200 faulty (by, as explained earlier, determining whether the outputs of the CPUs 200a, 200b and WDT 200c do not match.), and in addition thereto, it is determined whether the N2 sensor 64 of the primary lane 200 and/or the fuel metering valve 32 are abnormal (faulty), and/or the primary lane 200 is not provided with 28V operating power (shown for the primary lane 200 as "@P" in the drawing).

Whether the fuel metering valve 32 is abnormal (faulty) is determined from the detected position relative to the current command value Icom for the torque motor 98 (i.e., the position of the fuel metering valve 32 detected from the output of the FMVP sensor), i.e., by checking whether the fuel metering valve 32 is driven in accordance with the command value.

When the result in S12 is YES, the program proceeds to S14, in which the bit of the aforesaid flag is set to 1. The bit of this flag being set to 1 means that an abnormality (fault) mentioned above has occurred. In this case, therefore, the result in S10 in the next and following loops of the program is NO, so that the program proceeds to S16, in which it is determined that the primary lane 200 is inoperative and the program is terminated.

When the result in S12 is NO, the program proceeds to S18, in which it is checked whether the bit of a primary lane inspection flag is set to 0. As explained above, the engine 10 is subjected to start-up inspection immediately after engine starting, for example, by generating an instruction to switch alternately between outputs of the second control channel and the first control channel. As shown at (1), (2) and (3) in the time chart of FIG. 7, the bit of this flag being set to 0 means that an instruction has been generated or issued to switch from the output from the secondary lane 202 to the output of the primary lane 200 (switching instruction generated or issued), while its being reset to 1 means that such an instruction has not been generated (switching instruction not generated).

A NO result in S18 means that it is determined that no instruction has been generated to switch from the output of the secondary lane 202 to the output of the primary lane 200 ((2) in the time chart of FIG. 7). The program therefore proceeds to S20, in which the value Wf/P3 calculated by and outputted from block 80j of the other lane (secondary lane 202), more exactly the preceding value Wf/P3(t−1)@S (the value calculated in the preceding loop (cycle) of the program, i.e., the value 40 msec earlier), is inputted via the CAN interface unit 88 and is rewritten as the value Wf/P3(t−1)@P outputted from the subject lane (primary lane 200) in the preceding loop. In other words, the preceding value outputted from the other lane in the preceding loop is rewritten as the preceding value outputted from the subject lane in the preceding loop.

On the other hand, a YES result in S18 means that it is determined that an instruction has been generated to switch from the output of the secondary lane 202 to the output of the primary lane 200 (as shown at (1) and (3) in the time chart of FIG. 7). The program therefore proceeds to S22, in which the value Wf/P3 outputted from block 80j of the subject lane (primary lane 200), more exactly the preceding value Wf/P3 (t−1)@P (the value calculated at the subject lane in the preceding loop (cycle) of the program, i.e., the value 40 msec earlier), is rewritten as the value Wf/P3(t−1)@P of the output of the subject lane in the preceding loop. In other words, the value outputted from the subject lane in the preceding loop is immediately rewritten as the value outputted from the subject lane in the preceding loop.

Similar processing operations are also performed in the secondary lane 202, as will be explained with reference to FIG. 6.

In S100 of FIG. 6, it is checked whether the bit of a secondary lane faulty flag is reset to zero. In the first loop of the program, the result in S100 is ordinarily YES and the program proceeds to S102, in which it is determined whether the self-diagnostic circuit finds the CPU 202a of the secondary lane 202 faulty, and it is also determined whether the N2 sensor 64 of the secondary lane 202 and/or the fuel metering valve 32 are abnormal (faulty), and whether the secondary lane 202 has access to 28V operating power (shown for the secondary lane 202 as "@S" in the drawing).

When the result in S102 is YES, the program proceeds to S104, in which the bit of the aforesaid flag is set to 1. Therefore, the result in S100 in the next and following loops of the program is NO, so that program proceeds to S106, in which it is determined that the secondary lane 202 is inoperative and the program is terminated.

When the result in S102 is NO, the program proceeds to S108, in which it is checked whether the bit of the primary lane faulty flag is set to 1, i.e., whether the primary lane 200 is determined to be inoperative. When the result in S108 is NO, the program proceeds to S110, in which it is checked whether the bit of a secondary lane inspection flag is reset to 0. Similarly, the bit of this flag being set to 0 means that an instruction has been generated to switch from the output from the primary lane 200 to the output of the secondary lane 202 (switching instruction generated), while its being set to 1 means that such an instruction has not been generated (switching instruction not generated).

A NO result in S110 means that it is determined that no switching instruction has been generated (as shown at (1) and (3) in the time chart of FIG. 7). The program therefore proceeds to S112, in which the value Wf/P3 outputted from block 80j of the other lane (primary lane 200), more exactly the preceding value Wf/P3(t−1)@P (the value calculated in the other lane in the preceding loop (cycle), i.e., the value 40 msec earlier), is inputted via the CAN interface unit 88 and is rewritten as the preceding value Wf/P3(t−1)@S outputted from the subject lane (secondary lane 202) in the preceding loop.

A YES result in S110 means that it is determined that a switching instruction has been generated (as shown at (2) in the time chart of FIG. 7). The program therefore proceeds to S114, in which the value Wf/P3 outputted from block 80j of the subject lane (secondary lane 202), more exactly the value Wf/P3(t−1)@S outputted from the subject lane in the preceding loop, is immediately rewritten as the preceding value Wf/P3(t−1)@S (the value outputted from the subject lane in the preceding loop, i.e., the value 40 msec earlier). The same is also true when the result in S108 is YES (as shown at (4) in the time chart of FIG. 7).

As shown in FIG. 3, the ECU 80 sends the value Wf/P3 written in block 80k to the multiplication stage 801 to be multiplied by the output pressure P3, thereby obtaining the numerator Wf, which is defined as the command value (control input) Wfcom (FMVCMD) for controlling the final quantity of fuel (fuel flow rate) to be supplied to the engine 10. The multiplication stage 801 further uses the command value Wfcom to calculate the current command value Icom for the torque motor 98. Upon receiving the calculated command value, the FCU 30 controls the supply of fuel so as make it equal to the calculated fuel flow rate command value.

Therefore, although strictly speaking the value Wf/P3 rewritten in S20, S22 of FIG. 5 and S112, S114 of FIG. 6 is not the command value Wf (Wfcom), it can be deemed equivalent to the command value in the sense that it is the value from which the command value is calculated.

Thus, in the processing operations of the secondary lane 202 shown in FIG. 6, the output Wf/P3 of the primary lane 200 is rewritten as the output of secondary lane 202 so long as the primary lane 200 is not determined to be faulty, and when the primary lane 200 is determined to be faulty, the rewritten value is immediately outputted just after the faulty determination.

In the processing operations of FIGS. 5 and 6 during start-up inspection of the engine 10, so long as no instruction to switch between the outputs of the primary lane 200 and secondary lane 202 has been generated, the value calculated by the other lane is rewritten as value calculated by itself (calculated by the subject lane), while when a switching instruction has been generated, each lane outputs the value calculated by itself without modification.

Figure 8:
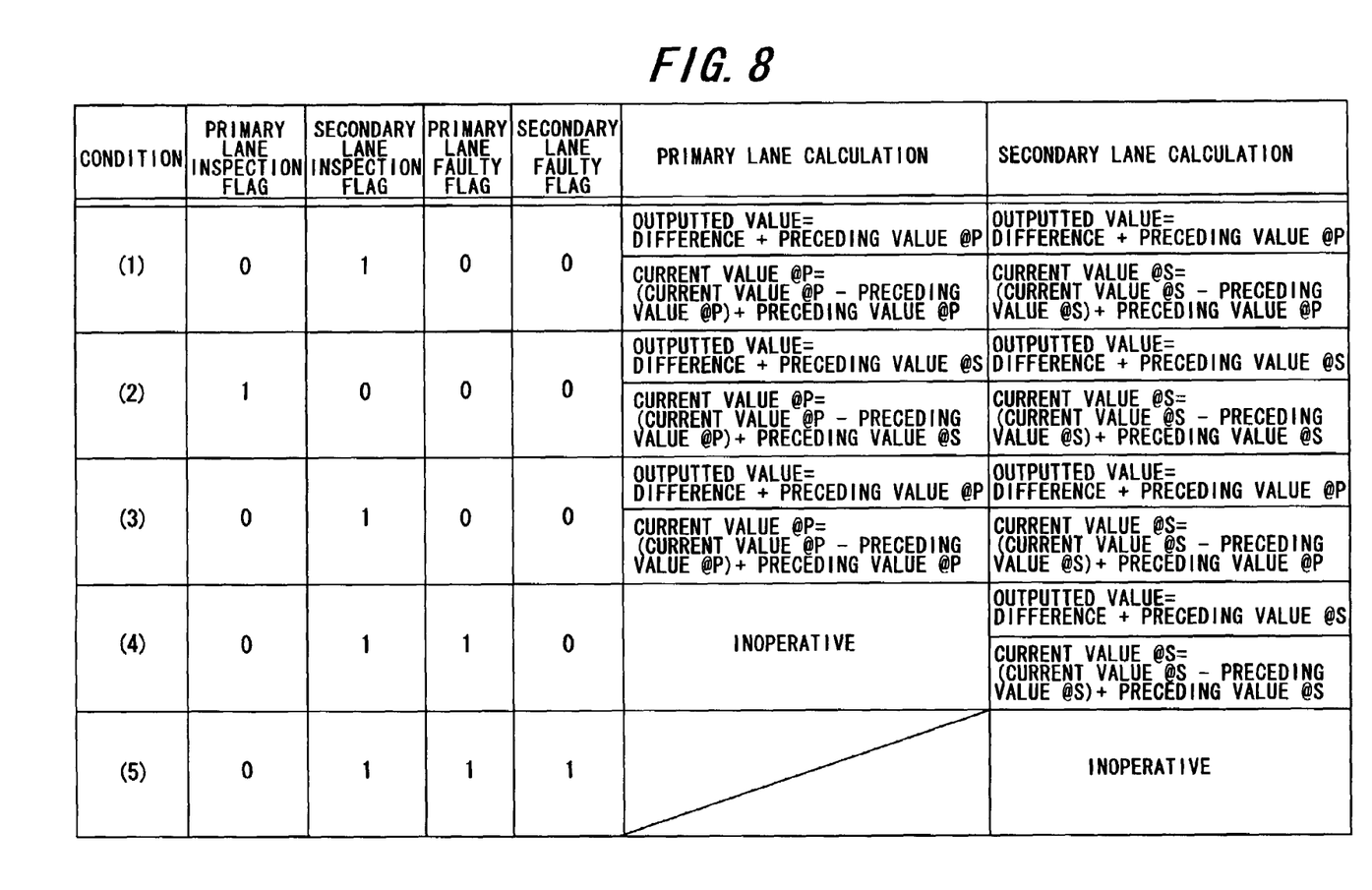
FIG. 8 is a time chart showing the arithmetic operations performed in the respective lanes during the switching illustrated in FIG. 7.

FIG. 8 is a time chart showing the arithmetic operations performed in the respective lanes during the switching shown in FIG. 7.

For simplifying the chart, Wf/P3(t) (the value calculated at the current cycle) is expressed as "current value" (i.e., the outputted value), and Wf/P3(t−1) (the value calculated at the cycle preceding thereto) is expressed as "preceding value". As shown in FIG. 8, the outputted values are calculated by incrementing the preceding value by the difference between the preceding value and the current value.

In the time chart of FIG. 8 (and FIG. 7), first in (1), the start-up inspection is performed based on the output of the primary lane 200 in response to starting of the engine 10. The primary lane 200 calculates an output in accordance with the flow chart of FIG. 5 as follows:

Current value @P=(Current value @P−Preceding value @P)+Preceding value @P　　　　Eq. 1

The secondary lane 202 concomitantly calculates an output in accordance with the flow chart of FIG. 6 as follows:

Current value @S=(Current value @S−Preceding value @S)+Preceding value @P　　　　Eq. 2

Next, in (2), because an instruction to switch from the output of the primary lane 200 to the output of secondary lane 202 has been generated, the secondary lane 202 calculates an output in accordance with the flow chart of FIG. 6 as follows:

Current value @S=(Current value @S−Preceding value @S)+Preceding value @S　　　　Eq. 3

The primary lane 200 concomitantly calculates an output in accordance with the flow chart of FIG. 5 as follows:

Current value @P=(Current value @P−Preceding value @P)+Preceding value @S　　　　Eq. 4

Next, in (3), an instruction to switch from the output of the secondary lane 202 to the output of the primary lane 200 is generated, so that the primary lane 200 calculates an output using Eq. 1 in accordance with the flow chart of FIG. 5 and the secondary lane 202 concomitantly calculates an output using Eq. 2 in accordance with the flow chart of FIG. 6.

Immediately after switching, the preceding value @S that is the third term on the right side of Eq. 3 is equal to the current value @S on the left side of Eq. 2. Therefore, the current value @S of Eq. 3 differs from the current value @S of Eq. 2 only by the difference between the current value and preceding value of the same lane, so that it should be quite small.

Further, the current value @S on the left side of Eq. 2 is a value calculated using the preceding value @P outputted by the primary lane 200 that is the third term on the right side. The same applies in (4), which will not be explained here. In other words, the outputted value of each lane is a value calculated by adding the difference of the subject lane (between the current value and preceding value) to the outputted value calculated by the other lane.

In this embodiment, as explained in the forgoing, when switching between lane outputs is performed for start-up inspection of the engine 10, the output just after switching can be made substantially equal to the output before switching, thereby preventing the difference between it and the preceding command value from becoming large and enabling the inspection of the engine 10 to be conducted unhindered.

Moreover, at the time of switching to the output (command value) of the secondary lane 202 because a malfunction has occurred in the primary lane 200, the output after switching can be made substantially equal to the output before switching, thereby preventing the difference between it and the preceding command value from becoming large.

In the foregoing, as shown at (5) in FIG. 7, after the control channel has been switched to the secondary lane 202 because the primary lane 200 became inoperative owing to occurrence of a malfunction, if the secondary lane 202 thereafter also becomes inoperative owing to occurrence of a malfunction, shut-off operation is implemented, i.e., the shutoff mechanism 108 is operated to mechanically block supply of fuel to the fuel nozzles 28. However, as indicated by the phantom line in FIG. 7 ((6) in the drawing), it is further possible to switch back to the primary lane 200 from the secondary lane 202 when the primary lane 200 has resumed normal operation.

As mentioned above, this embodiment is configured to have a system for controlling a gas-turbine engine (10) having at least a turbine (low-pressure turbine 4, high-pressure turbine 40), comprising: a plurality of sensors (N1 sensor 62, etc.) generating outputs indicative of operating conditions of the engine including a rotational speed of the turbine; a first control channel (primary lane 200) inputting the outputs of the sensors to calculate a first command value (Wf/P3) indicative of a quantity of fuel to be supplied to the engine and outputting the first command value; a second control channel (secondary lane 202) being operative in parallel with the first control channel, inputting the outputs of the sensors to calculate a second command value (Wf/P3) indicative of the quantity of fuel to be supplied to the engine and outputting the second command value; a switching instruction generator (ECU 80, S18, S108, S110) generating an instruction to switch from one to the other between the outputs of the first and second control channels in response to the operating condition of the engine; and a fuel control unit (30) controlling the supply of fuel to the engine based on the switched one of the outputs of the first and second control channels; characterized in that the second control channel calculates and outputs the second command value using the first command value so long as the instruction to switch the outputs is not generated (S112), while calculates and outputs the second command value, without using the first command value, when the instruction to switch the outputs is generated (S114). With this, Immediately after switching to the second command value calculated by the second control channel, therefore, the second command value is substantially equal to and not greatly different from the preceding first command value.

In the system, the first control channel calculates and outputs the first command value using the second command value so long as the instruction to switch the outputs is not generated (S20), while calculates and outputs the first command value, without using the second command value, when the instruction to switch the outputs is generated (S22). With this, in addition to providing the foregoing advantage, the system provides the further advantage that immediately after switching back to the first command value calculated by the first control channel, the first command value is substantially equal to and not greatly different from the preceding second command value.

In the system, the switching instruction generator generates the instruction to switch the outputs for inspection at starting of the engine (10). With this, in addition to providing the foregoing advantages, the system provides the further advantage that also at the time of start-up inspection conducted immediately after engine starting, for example, the inspection can be conducted unhindered, without the command value becoming greatly different from the preceding command value.

In the system, the switching instruction generator generates the instruction to switch from the output of the first control channel (primary lane 200) to the output of the second control channel (secondary lane 202), when it is determined that a malfunction has occurred in the first control channel.

In the system, the second control channel calculates and outputs the second command value cyclically based on a difference between the second command value calculated at a cycle (Wf/P3(t)) and that calculated at a cycle preceding thereto (Wf/P3(t−1)) and the first command value, so long as the instruction to switch the outputs is not generated (S112). Specifically, the second control channel calculates and outputs the second command value based on a sum of the difference and the first command value (S112).

In the system, the first control channel calculates and outputs the first command value cyclically based on a difference between the first command value calculated at a cycle (current value) and that calculated at a cycle preceding thereto (preceding value) and the second command value, so long as the instruction to switch the outputs is not generated (S20). Specifically, the first control channel calculates and outputs the first command value based on a sum of the difference and the second command value (S20).

In the above, it might be considered possible to use low-pass filters instead of the adopting the calculated value rewriting set out in the foregoing. However, use of low-pass filters is inferior in effectiveness to the rewriting explained above because the slower response of low-pass filters is liable to increase in thrust fluctuation in proportion.

Although the value inputted to the multiplication stage 801 of FIG. 3 is rewritten in the foregoing, the invention is not limited to this arrangement and it is possible instead to rewrite the value after the multiplication stage 801 or rewrite the current command value Icom.

Although a turbofan engine has been used as an example of a gas-turbine aeroengine in the foregoing, the engine can instead be a turbojet engine, turboprop engine, turboshaft engine or the like.

Japanese Patent Application No. 2004-156636 filed on May 26, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system configured to control a gas-turbine engine having at least a turbine, comprising:

a plurality of sensors configured to generate outputs indicative of operating conditions of the engine including a rotational speed of the turbine;

a first control channel configured to input the outputs of the sensors to calculate a first command value indicative of a quantity of fuel to be supplied to the engine and outputting the first command value;

a second control channel, being operative in parallel with the first control channel, configured to input the outputs of the sensors to calculate a second command value indicative of the quantity of fuel to be supplied to the engine and outputting the second command value;

a switching instruction generator configured to generates an instruction to switch from one to the other between the outputs of the first and second control channels in response to the operating condition of the engine; and a fuel control unit configured to control the supply of fuel to the engine based on the switched one of the outputs of the first and second control channels;

wherein the second control channel is further configured to calculate and output the second command value using the first command value so long as the instruction to switch the outputs is not generated, while calculating and outputting the second command value, without using the first command value, when the instruction to switch the outputs is generated.

2. The system according to claim 1, wherein the first control channel is further configured to calculate and output the first command value using the second command value so long as the instruction to switch the outputs is not generated, while calculating and outputting the first command value, without using the second command value, when the instruction to switch the outputs is generated.

3. The system according to claim 2, wherein the switching instruction generator is further configured to generate the instruction to switch the outputs for inspection at starting of the engine.

4. The system according to claim 2, wherein the first control channel is further configured to calculate and output the first command value cyclically based on a difference between the first command value calculated at a cycle and that calculated at a cycle preceding thereto and the second command value, so long as the instruction to switch the outputs is not generated.

5. The system according to claim 4, wherein the first control channel is further configured to calculate and output the first command value based on a sum of the difference and the second command value.

6. The system according to claim 1, wherein the switching instruction generator is further configured to generate the instruction to switch the outputs for inspection at starting of the engine.

7. The system according to claim 1, wherein the switching instruction generator is further configured to generate the instruction to switch from the output of the first control channel to the output of the second control channel, when it is determined that a malfunction has occurred in the first control channel.

8. The system according to claim 1, wherein the second control channel is further configured to calculate and output the second command value cyclically based on a difference between the second command value calculated at a cycle and that calculated at a cycle preceding thereto and the first command value, so long as the instruction to switch the outputs is not generated.

9. The system according to claim 8, wherein the second control channel is further configured to calculate and output the second command value based on a sum of the difference and the first command value.

10. A method of controlling a gas-turbine engine having at least a turbine, comprising:

sensing and generating outputs indicative of operating conditions of the engine including a rotational speed of the turbine;

inputting the generated outputs to calculate a first command value indicative of a quantity of fuel to be supplied to the engine and outputting the first command value;

inputting the outputs of the sensors to calculate a second command value indicative of the quantity of fuel to be supplied to the engine, in parallel with the calculation of first command value, and outputting the second command value;

generating an instruction to switch from one to the other between the outputs of the first and second command values in response to the operating condition of the engine; and controlling the supply of fuel to the engine based on the switched one of the outputs of the first and second command values;

wherein the inputting the outputs of the sensors comprises calculating and outputting the second command value using the first command value so long as the instruction to switch the outputs is not generated, while calculating and outputting the second command value, without using the first command value, when the instruction to switch the outputs is generated.

11. The method according to claim 10, wherein the inputting the generated outputs comprises calculating and outputting the first command value using the second command value so long as the instruction to switch the outputs is not generated, while calculating and outputting the first command value, without using the second command value, when the instruction to switch the outputs is generated.

12. The method according to claim 11, wherein the generating generates the instruction to switch the outputs for inspection at starting of the engine.

13. The method according to claim 11, wherein the inputting the generated outputs comprises calculating and outputting the first command value cyclically based on a difference between the first command value calculated at a cycle and that calculated at a cycle preceding thereto and the second command value, so long as the instruction to switch the outputs is not generated.

14. The method according to claim 13, wherein the inputting the generated outputs comprises calculating and outputting the first command value based on a sum of the difference and the second command value.

15. The method according to claim 10, wherein the generating generates the instruction to switch the outputs for inspection at starting of the engine.

16. The method according to claim 10, wherein the generating generates the instruction to switch from the output of the first control channel to the output of the second control channel, when it is determined that a malfunction has occurred in the inputting the generated outputs.

17. The method according to claim 10, wherein the inputting the outputs of the sensors comprises calculating and outputting the second command value cyclically based on a difference between the second command value calculated at a cycle and that calculated at a cycle preceding thereto and the first command value, so long as the instruction to switch the outputs is not generated.

18. The method according to claim 17, wherein the inputting the outputs of the sensors comprises calculating and outputting the second command value based on a sum of the difference and the first command value.

* * * * *